(12) United States Patent
Ishikawa

(10) Patent No.: US 10,723,315 B2
(45) Date of Patent: Jul. 28, 2020

(54) ELECTRONIC KEY SYSTEM FOR VEHICLE, AND PORTABLE DEVICE

(71) Applicant: DENSO CORPORATION, Kariya, Aichi-pref. (JP)

(72) Inventor: Ryusuke Ishikawa, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 63 days.

(21) Appl. No.: 15/780,243

(22) PCT Filed: Nov. 21, 2016

(86) PCT No.: PCT/JP2016/084430
§ 371 (c)(1),
(2) Date: May 31, 2018

(87) PCT Pub. No.: WO2017/094544
PCT Pub. Date: Jun. 8, 2017

(65) Prior Publication Data
US 2018/0370487 A1    Dec. 27, 2018

(30) Foreign Application Priority Data

Dec. 3, 2015    (JP) .................................. 2015-236916

(51) Int. Cl.
*B60R 25/24* (2013.01)
*G08C 17/02* (2006.01)
(Continued)

(52) U.S. Cl.
CPC .............. *B60R 25/24* (2013.01); *B60R 25/01* (2013.01); *B60R 25/10* (2013.01); *B60R 25/34* (2013.01);
(Continued)

(58) Field of Classification Search
CPC ..... B60R 25/24; B60R 25/241; B60R 25/245; G08G 1/00; H01Q 1/00; G07C 9/00309;
(Continued)

(56) References Cited

U.S. PATENT DOCUMENTS 6,127,740 A * 10/2000 Roddy .................... B60R 25/24
307/10.1
2005/0237152 A1* 10/2005 Nakashima ........... B60R 25/246
340/5.65

(Continued)

FOREIGN PATENT DOCUMENTS

JP    2010185186 A    8/2010
JP    2012082654 A    4/2012

*Primary Examiner* — Annie Marie Antonucci
*Assistant Examiner* — Andrew J Cromer
(74) *Attorney, Agent, or Firm* — Harness, Dickey & Pierce, P.L.C.

(57) ABSTRACT

Provided is an electronic key system for a vehicle. The electronic key system for a vehicle includes an in-vehicle device and a portable device and performs a predetermined control process on a vehicle on the basis of verification successfully made between the in-vehicle device and the portable device. When receiving a verification signal, the portable device transmits a response signal in accordance with the verification signal. When an operation detection unit detects a user operation, the portable device transmits an instruction signal for controlling a state of locking of a door of the vehicle. An output level of the response signal from the portable device is lower than an output level of the instruction signal.

8 Claims, 6 Drawing Sheets

(51) Int. Cl.
 *H04W 4/44* (2018.01)
 *B60R 25/01* (2013.01)
 *B60R 25/10* (2013.01)
 *B60R 25/34* (2013.01)
 *H04W 12/06* (2009.01)
 *H04W 84/10* (2009.01)

(52) U.S. Cl.
 CPC .............. *G08C 17/02* (2013.01); *H04W 4/44* (2018.02); *H04W 12/06* (2013.01); *G08C 2201/60* (2013.01); *G08C 2201/91* (2013.01); *H04W 84/10* (2013.01)

(58) Field of Classification Search
 CPC ........... G07C 2009/00357; G07C 2009/00365; G07C 2009/00388; G07C 2009/00555; G07C 2009/00793; G07C 2209/62; E05B 81/78
 See application file for complete search history.

(56) References Cited

U.S. PATENT DOCUMENTS

| | | | |
|---|---|---|---|
| 2006/0091997 A1* | 5/2006 | Conner | B60R 25/1003 340/5.64 |
| 2011/0057817 A1* | 3/2011 | Proefke | G01S 13/74 340/989 |

* cited by examiner

ELECTRONIC KEY SYSTEM FOR VEHICLE, AND PORTABLE DEVICE

CROSS REFERENCE TO RELATED APPLICATIONS

This application is a U.S. National Phase Application under 35 U.S.C. 371 of International Application No. PCT/JP2016/084430 filed on Nov. 21, 2016 and published in Japanese as WO 2017/094544 A1 on Jun. 8, 2017. This application is based on and claims the benefit of priority from Japanese Patent Application No. 2015-236916 filed on Dec. 3, 2015. The entire disclosures of all of the above applications are incorporated herein by reference.

TECHNICAL FIELD

The present disclosure relates to an electronic key system for a vehicle, which performs a wireless communication between an in-vehicle device to be mounted in a vehicle and a portable device to be carried by a user, and to the portable device included in the electronic key system for a vehicle.

BACKGROUND ART

Conventionally, an electronic key system for a vehicle has been known in which an in-vehicle device mounted in a vehicle and a portable device carried by a user perform code verification between each other using wireless communication, and the in-vehicle device performs vehicle control such as locking/unlocking of vehicle doors or starting of an engine on the basis of the code verification being made successfully. In this type of electronic key system for a vehicle, the range reached by a wireless signal transmitted from the in-vehicle device is limited to a short range around a vehicle. This is for the purpose of limiting the situation in which an authentication process based on the code verification is performed between the in-vehicle device and the portable device to the case where the portable device is present in the vicinity of the vehicle.

However, such an electronic key system for a vehicle raises a concern about a relay attack in which a malicious third party uses a relay to indirectly provide communication between a portable device and an in-vehicle device and thus effect successful code verification. The relay attack enables successful code verification unintended by an authorized user and enables vehicle control such as unlocking of vehicle doors or starting of an engine.

On the other hand, various configurations for preventing such a relay attack have been proposed. For example, Patent Literature 1 discloses an electronic key system for a vehicle in which an in-vehicle device sequentially transmits wireless signals at two types of output levels (i.e., transmission powers) and, only when a portable device detects a level difference between the received signals, a signal is returned from the portable device to the in-vehicle device.

In general, a relay transfers a radio wave in a frequency band to be relayed at a given output level. Accordingly, when the radio wave transmitted from an in-vehicle device is relayed by the relay, a level difference between the received signals, which is to be intrinsically detected, is no longer detected. That is, the configuration in Patent Literature 1 can restrict the portable device from returning a response to the signal from the in-vehicle device that has been relayed by the relay. When no response is returned from the portable device, code verification is unsuccessful (i.e., has failed).

PRIOR ART LITERATURE

Patent Literature

Patent Literature 1: JP 2010-185186 A

SUMMARY OF INVENTION

Patent Literature 1 discloses a method which enhances the security performance of the electronic key system for a vehicle by preventing the portable device from returning a response to the signal from the in-vehicle device that has been relayed by the relay.

However, in Patent Literature 1, no measure is taken against a hypothetical case where the portable device has returned a response signal. From a security point of view, even if the portable device has transmitted a response signal, it is desirable to be able to inhibit unauthorized verification from being successfully made.

It is therefore an object of the present disclosure to provide an electronic key system for a vehicle which can reduce the probability that unauthorized verification is successfully made between an in-vehicle device and a portable device in wireless communication.

An electronic key system for a vehicle according to a first aspect of the present disclosure includes: an in-vehicle device to be mounted in a vehicle; and a portable device that is associated with the in-vehicle device and is to be carried by a user of the vehicle. The in-vehicle device performs a predetermined control process on the vehicle on the basis of verification successfully made between the in-vehicle device and the portable device using wireless communication. The in-vehicle device includes an in-vehicle device transmission unit which transmits a verification signal for authenticating the portable device from a vehicle transmission antenna provided in the vehicle. The portable device includes: an operation detection unit which detects a user operation has been performed to control a state of locking of the vehicle; a portable-device reception unit which receives the verification signal via a portable-device reception antenna; a portable-device transmission unit which transmits a signal in a predetermined frequency band from a portable-device transmission antenna; and an output adjustment unit which adjusts an output level of a signal to be transmitted from the portable-device transmission antenna. When the portable-device reception unit receives the verification signal, the portable-device transmission unit transmits a response signal in accordance with the verification signal. When the operation detection unit detects the user operation, the portable-device transmits an instruction signal for controlling a state of locking of a door of the vehicle. The output adjustment unit sets an output level of the response signal to a predetermined level lower than an output level of the instruction signal.

In the configuration described above, when the portable device transmits the response signal responding to the verification signal, the response signal is transmitted at the output level lower than when the instruction signal corresponding to the user operation is transmitted. Consequently, the range reached by the response signal is smaller than the range reached by the instruction signal.

As a result, it is possible to reduce the risk that the response signal may be relayed by a relay. In other words, it is possible to reduce the probability that unauthorized verification is successfully made between the in-vehicle device and the portable device in wireless communication.

An electronic key system for a vehicle according to a second aspect of the present disclosure includes: an in-vehicle device to be mounted in a vehicle; and a portable device associated with the in-vehicle device and to be carried by a user of the vehicle. The in-vehicle device performs a predetermined control process on the vehicle on the basis of verification successfully made between the in-vehicle device and the portable device using wireless communication. The in-vehicle device includes an in-vehicle device transmission unit which transmits a verification signal for authenticating the portable device from a vehicle transmission antenna provided in the vehicle. The verification signal includes verification situation information showing to which one of a vehicle interior verification signal as the verification signal for performing vehicle interior verification and a vehicle exterior verification signal as the verification signal for performing vehicle exterior verification the verification signal corresponds. The portable device includes: a portable-device reception unit which receives the verification signal via a portable-device reception antenna; a portable-device transmission unit which transmits, from a portable-device transmission antenna, a response signal in accordance with the verification signal received by the portable-device reception unit; an output adjustment unit which adjusts an output level of the signal to be transmitted from the portable-device transmission antenna; and a response type determination unit which determines to which one of the vehicle interior verification signal and the vehicle exterior verification signal the response signal to be transmitted from the portable-device transmission unit responds on the basis of the verification situation information included in the verification signal. The output adjustment unit sets an output level of the response signal responding to the vehicle interior verification signal to a predetermined level lower than an output level of the response signal responding to the vehicle exterior verification signal.

In the configuration described above, the in-vehicle device transmits the verification signal including the verification situation information. The verification situation information shows to which one of the vehicle interior verification signal for performing vehicle interior verification and the vehicle exterior verification signal for performing vehicle exterior verification the verification signal corresponds. When the portable device receives the verification signal, the response type determination unit determines to which one of the vehicle interior verification signal and the vehicle exterior verification signal the verification signal to be returned corresponds on the basis of the verification situation information included in the received verification signal.

When the response signal responding to the vehicle interior verification signal is transmitted, the response signal is transmitted at the output level lower than when the response signal responding to the vehicle exterior verification signal is transmitted. Consequently, the range reached by the response signal responding to the vehicle interior verification signal is smaller than the range reached by the response signal responding to the vehicle exterior verification signal. As a result, it is possible to reduce the risk that unauthorized vehicle interior verification is successfully made through the relay of the response signal from the portable device.

A portable device according to an aspect of the present disclosure is a portable device for use in an electronic key system for a vehicle in which an in-vehicle device mounted in a vehicle and the portable device associated with the in-vehicle device perform an authentication process between each other using wireless communication and perform a predetermined control process on the vehicle on the basis of the authentication process performed successfully. The portable device includes: an operation detection unit which detects a user operation performed to control a state of locking of the vehicle; a portable-device reception unit which receives a verification signal transmitted from the in-vehicle device to authenticate the portable device; a portable-device transmission unit which transmits a signal in a predetermined frequency band from a portable-device transmission antenna; and an output adjustment unit which adjusts an output level of the signal to be transmitted from the portable-device transmission antenna. When the portable-device reception unit receives the verification signal, the portable-device transmission unit transmits a response signal in accordance with the verification signal. When the operation detection unit detects the user operation, the portable-device transmission unit transmits an instruction signal for controlling a state of locking of a door of the vehicle. The output adjustment unit sets an output level of the response signal to a predetermined level lower than an output level of the instruction signal.

The portable device having the configuration described above corresponds to the portable device used in the above-described electronic key system for a vehicle according to the first aspect. In other words, the portable device described above achieves the same effects as achieved by the electronic key system for a vehicle according to the first aspect.

BRIEF DESCRIPTION OF DRAWINGS

The above and other objects, features and advantages of the present disclosure will become more apparent from the following detailed description made with reference to the accompanying drawings, in which.

DESCRIPTION OF EMBODIMENTS

Figure 1:
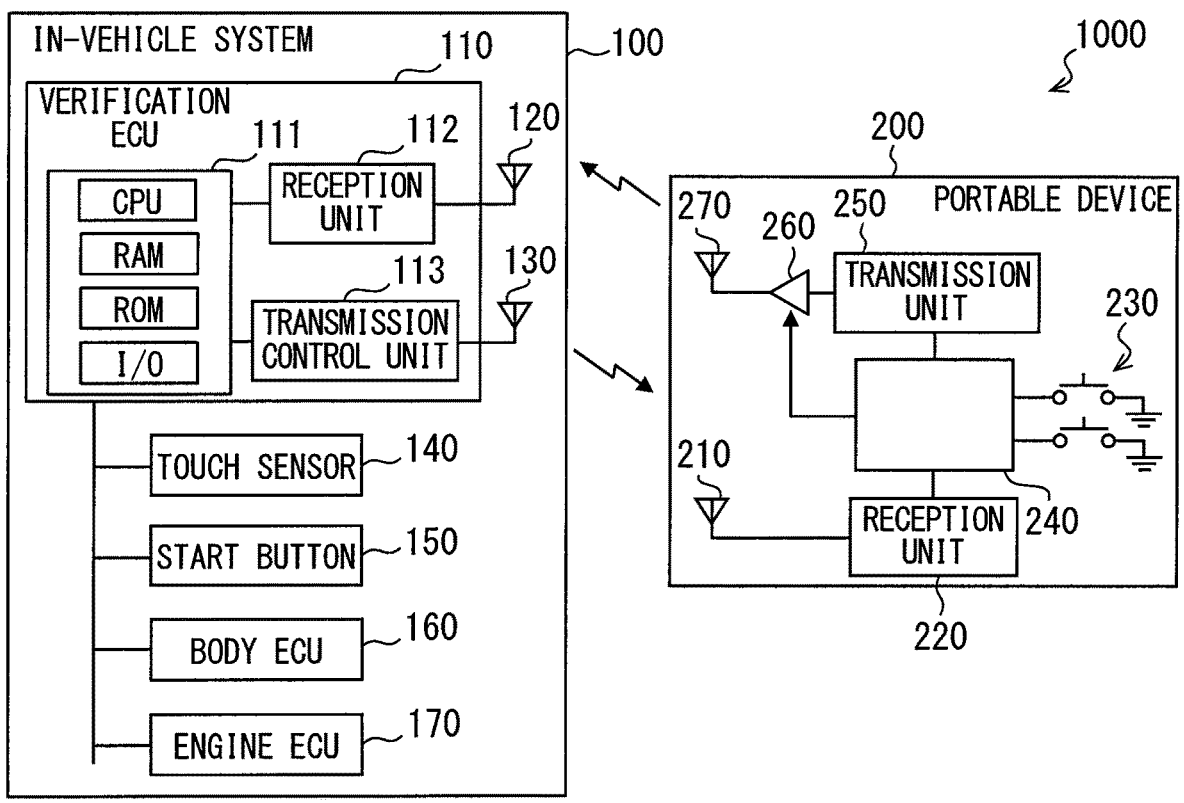
FIG. 1 is a block diagram showing an example of a schematic configuration of an electronic key system for a vehicle.

The following will describe an embodiment with reference to the drawings. FIG. 1 is a diagram showing an example of a schematic configuration of an electronic key system 1000 for a vehicle according to the present embodiment. As shown in FIG. 1, the vehicular electronic key system 1000 includes an in-vehicle system 100 mounted in a vehicle and a portable device 200 carried by a user. The portable device 200 is associated with the in-vehicle system 100 and has the function of a key specific to the vehicle. For the sake of convenience, the vehicle in which the in-vehicle system 100 associated with the portable device 200 is mounted is hereinafter referred to as a host vehicle.

<Outline of Vehicular Electronic Key System 1000>

Each of the in-vehicle system 100 and the portable device 200 has a function for implementing a known remote keyless entry (hereinafter abbreviated as RKE) system. Specifically, the portable device 200 has a plurality of switches 230 operated by the user and transmits a command signal corresponding to the switch 230 operated by the user to the in-vehicle system 100. On receiving the command signal transmitted from the portable device 200, the in-vehicle system 100 performs vehicle control in accordance with the received command signal. For example, the in-vehicle system 100 controls the state of locking (i.e., locking/unlocking) of vehicle doors on the basis of the command signal transmitted from the portable device 200. The command signal corresponds to an instruction signal.

Each of the in-vehicle system 100 and the portable device 200 has a function for implementing a known smart entry system by performing wireless communication using a radio wave in a predetermined frequency band between each other.

Specifically, the in-vehicle system 100 has the function of transmitting a signal in a predetermined LF (Low Frequency) band toward a predetermined range (hereinafter referred to as a wireless communication area) in the vehicle interior or around the vehicle and the function of receiving a signal in a predetermined RF (Radio Frequency) band transmitted from the portable device 200. The portable device 200 has the function of receiving the signal in the LF band transmitted from the in-vehicle system 100 and the function of returning the signal in the predetermined RF band to the in-vehicle system 100.

By way of example, it is assumed herein that the LF band includes frequencies from 20 kHz to 200 kHz. It is also assumed that the RF band includes frequencies from 300 MHz to 400 MHz. The respective ranges of frequencies indicated by the LF band and the RF band may be set out appropriately. Needless to say, signal transmission from the in-vehicle system 100 to the portable device 200 may also use a radio wave in a frequency band other than the LF band described above. Likewise, signal transmission from the portable device 200 to the in-vehicle system 100 may also use a radio wave in a frequency band other than the RF band.

In such a configuration, when the portable device 200 is present in the wireless communication area, the in-vehicle system 100 performs a verification process with the portable device 200 using wireless communication and performs various control for performing the locking/unlocking of the doors, the starting of an engine, and the like on the basis of the verification made successfully.

Note that the verification process mentioned herein is a process in which the in-vehicle system 100 verifies that the communication terminal (hereinafter referred to as a communication partner) wirelessly communicating with the in-vehicle system 100 is the portable device 200 (i.e., authorized portable device 200) associated with the in-vehicle system 100. The verification made successfully corresponds to the authentication of the authorized portable device 200.

The authentication of the portable device 200 by the in-vehicle system 100 using wireless communication allows the user carrying the portable device 200 to perform the locking/unlocking of the doors, the starting/stopping of the engine, and the like without operating the portable device 200 serving as the key.

Note that the wireless communication area formed by the in-vehicle system 100 may be set out appropriately. For example, the wireless communication area outside the vehicle interior is assumed to be a range within several meters from the vehicle. In each of the in-vehicle system 100 and the portable device 200, a vehicle ID as an identification number specific to the in-vehicle system 100 or the portable device 200 is stored. The authentication of the portable device 200 through the verification process described above is performed using an ID code generated from the vehicle ID. The details of the verification process will be separately described later.

<Configuration of in-Vehicle System 100>

Next, a description will be given of a configuration of the in-vehicle system 100. As shown in FIG. 1, the in-vehicle system 100 includes a verification ECU 110, a vehicle reception antenna 120, a vehicle transmission antenna 130, a touch sensor 140, a start button 150, and a body ECU 160.

The verification ECU 110 is an ECU (Electronic Control Unit) which performs various processes for implementing the smart entry system and the RKE system (hereinafter referred to as a keyless entry system or the like) each described above. The verification ECU 110 is communicatively connected to each of the vehicle reception antenna 120, the vehicle transmission antenna 130, the touch sensor 140, the start button 150, and the body ECU 160 via a LAN (Local Area Network) built in the vehicle.

The verification ECU 110 includes, as subsidiary components, a vehicle control unit 111, a reception unit 112, and a transmission control unit 113. Each of the reception unit 112 and the transmission control unit 113 may be implemented as hardware using one or a plurality of ICs or the like or may also be implemented through the execution of a predetermined program by a microprocessor. Needless to say, each of the reception unit 112 and the transmission control unit 113 may also be implemented using the execution of a program by a microprocessor and a hardware member in combination. The verification ECU 110 corresponds to an in-vehicle device.

The vehicle reception antenna 120 receives a radio wave in the RF band, converts the radio wave to an electric signal, and outputs the electric signal to the reception unit 112. It is appropriate that at least the one vehicle reception antenna 120 is provided at a position set out appropriately in the vehicle.

The vehicle transmission antenna 130 converts a signal input from the transmission control unit 113 to a radio wave in the LF band and emits the radio wave into a space. A plurality of the vehicle transmission antennas 130 are provided at a plurality of locations in the vehicle. For example, the vehicle transmission antennas 130 are provided in the vicinity of the door handle provided at each of the doors of the vehicle, in the vicinity of the door handle of a trunk door, and at any position in the vehicle interior. The range reached by the radio wave transmitted from each of the vehicle transmission antennas 130 is set out appropriately so as to form the wireless communication area described above.

The touch sensor 140 is provided in each of the door handles of the vehicle and detects touch of the user on the door handle. The result of the detection by each of the touch sensors 140 is sequentially output to the verification ECU 110 (specifically, the vehicle control unit 111).

The start button 150 is a push switch for the user to start the engine. On receiving a push operation by the user, the start button 150 outputs a control signal indicative of the user's push operation to the vehicle control unit 111.

The body ECU 160 is an ECU which controls the various actuators mounted in the vehicle. For example, the body ECU 160 outputs a drive signal for controlling the locking/unlocking of the doors provided in the vehicle to the door lock motor provided in each of the vehicle doors on the basis of an instruction from the verification ECU 110 to lock/unlock the door.

The engine ECU 170 is an ECU which controls the operation of the engine. For example, on acquiring a start instruction signal including an instruction to start the engine from the verification ECU 110, the engine ECU 170 starts the engine.

Note that, in the present embodiment, by way of example, the host vehicle is assumed to be an engine vehicle including only the engine as a power source, but the host vehicle is not limited thereto. The host vehicle may also be a so-called hybrid vehicle including an engine and a motor as a power source or an electric vehicle including only a motor as a power source. The engine ECU 170 corresponds to an ECU which controls the operation of the power source.

The vehicle control unit 111 is configured as a typical computer and includes a CPU, a RAM, a ROM, an I/O, a bus line connecting these components, and the like. In the ROM, a program (hereinafter referred to as a vehicle control program) for causing a typical computer to function as the vehicle control unit 111 in the present embodiment and the like are stored.

Note that the vehicle control program described above may be stored appropriately in a non-transitory tangible storage medium. The execution of the vehicle control program by the CPU corresponds to the implementation of a method corresponding to the vehicle control program. As a result of the execution of the vehicle control program by the CPU, the vehicle control unit 111 performs a process intended to be performed in the in-vehicle system 100 to implement the smart entry system and the like. The details of the vehicle control unit 111 will be separately described later.

The reception unit 112 performs a predetermined process such as analog-to-digital conversion, demodulation, or decoding on a signal input from the vehicle reception antenna 120 to extract the data included in the received signal. Then, the reception unit 112 provides the extracted data to the vehicle control unit 111. The reception unit 112 corresponds to an in-vehicle device reception unit.

The transmission control unit 113 performs a predetermined process such as coding, modulation, or digital-to-analog conversion on a baseband signal input from the vehicle control unit 111 to convert the baseband signal to a carrier wave signal. Then, the transmission control unit 113 outputs the carrier wave signal generated on the basis of the baseband signal to the vehicle transmission antenna 130 and emits the carrier wave signal as a radio wave. The transmission control unit 113 corresponds to an in-vehicle device transmission unit.

<About Function of Vehicle Control Unit 111>

Figure 2:
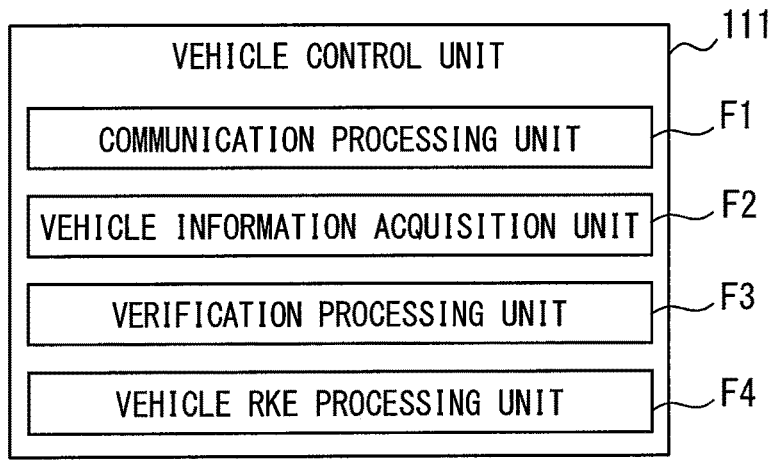
FIG. 2 is a block diagram showing an example of a schematic configuration of a vehicle control unit.

The vehicle control unit 111 includes, as functional blocks to be implemented through the execution of the vehicle control program by the CPU, a communication processing unit F1, a vehicle information acquisition unit F2, a verification processing unit F3, and an RKE processing unit F4, as shown in FIG. 2. Note that any or all of the functions of the vehicle control unit 111 may also be implemented as hardware using one or a plurality of ICs or the like.

The communication processing unit F1 acquires the data received by the reception unit 112 via the vehicle reception antenna 120. The communication processing unit F1 also generates a signal to be transmitted from the vehicle transmission antenna 130 on the basis of a request from the verification processing unit F3 and outputs the generated signal to the transmission control unit 113.

The vehicle information acquisition unit F2 acquires various information (i.e., vehicle information) showing the state of the vehicle from the sensors and the ECUs which are mounted in the vehicle, such as the touch sensor 140, the start button 150, the body ECU 160, and the engine ECU 170. To the vehicle information, e.g., whether or not the user is touching any of the door handles, whether or not the start button 150 is pressed, the open/closed state of each of the doors, the state locking of each of the doors, and the like corresponds.

Information on whether or not the user is touching any of the door handles can be acquired from the touch sensor 140. Whether or not the start button 150 is pressed can be determined from the signal output from the start button 150. The open/closed state of each of the doors, the locked/unlocked state of each of the doors, and the like can also be acquired from, e.g., the body ECU 160 via the LAN. Note that the open/closed state of each of the doors may be detected appropriately by a courtesy switch.

Note that the information items included in the vehicle information are not limited to those mentioned above. A shift position detected by a shift position sensor not shown, a detection result from a brake sensor which detects whether or not a brake pedal is stepped on, and the like are also included in the vehicle information.

The vehicle information acquired by the vehicle information acquisition unit F2 is used by the verification processing unit F3 to recognize the current state of the vehicle. For example, when the engine is OFF and all the doors are locked, the verification processing unit F3 determines that the vehicle is parked.

The verification processing unit F3 performs sequential processes for performing verification with the portable device 200 using wireless communication. The verification processing unit F3 performs the verification processes assuming two different types of situations, which are vehicle exterior verification performed assuming the state where the portable device 200 is present exterior to the vehicle interior and vehicle interior verification for verifying that the portable device 200 is present in the vehicle interior.

The vehicle exterior verification includes, e.g., verification (hereinafter referred to as verification for riding) for the user to take a ride in the parked vehicle, verification (hereinafter referred to as verification for locking) for locking the vehicle, and the like. On the other hand, the vehicle interior verification includes verification (hereinafter referred to as verification for starting) for starting the engine on the basis of a pushing operation on the start button 150. The following will briefly describe the sequential flow of each of the vehicle exterior verification and the vehicle interior verification. Note that, as the procedures of the various verifications, known procedures can also be used in addition to those shown in the following example.

When the vehicle is parked, the verification processing unit F3 cooperates with the communication processing unit F1 to perform, as a preparatory process for performing the verification for riding, transmission of a polling signal from the vehicle transmission antenna 130 at a predetermined polling period (e.g., 200 milliseconds). The polling signal is a signal requesting a response from the portable device 200. By receiving a response signal responding to the polling signal, the verification processing unit F3 can detect the presence of a communication terminal which may be the portable device 200 in the wireless communication area.

When receiving a response to the polling signal, the verification processing unit F3 transmits a challenge signal as a signal for performing code verification. The challenge signal is a signal requesting the portable device 200 to return a signal (hereinafter referred to as a response signal) including the ID code resulting from coding of the vehicle ID using a predetermined function. The challenge signal corresponds to a verification signal.

When the ID code included in the returned response signal matches the ID code stored in the verification processing unit F3 or meets a predetermined relationship, the verification processing unit F3 determines that verification is successful (authenticates the authorized portable device 200) and brings the doors into an unlocking ready state. The unlocking ready state is a state where the user can unlock the doors by merely touching the touch sensor of any of the doors.

When detecting the performance of a user operation corresponding to an instruction to lock the doors in the state where the engine is OFF and all the doors are closed, the verification processing unit F3 transmits the challenge signal for the verification for locking to perform the verification of the ID code. When the verification of the ID code is successful, the verification processing unit F3 instructs the body ECU 160 to lock each of the doors. Note that the user operation for locking the doors may be detected appropriately on the basis of, e.g., an output signal from the switch for receiving a locking instruction from the user, which is provided in the vicinity of each of the door handles.

When the start button 150 is pushed, the verification processing unit F3 transmits the challenge signal for the verification for starting and performs the verification of the ID code. When the code verification is successful, the verification processing unit F3 instructs the engine ECU 170 to start the engine.

Identifying the authorized portable device 200 by transmitting the challenge signal and comparing the ID code included in the returned response signal to the ID code stored in the verification processing unit F3 corresponds to the verification process. Note that the present embodiment is in the mode in which, as an authentication method for the portable device 200, a challenge/response method is used. However, the authentication method for the portable device 200 is not limited thereto, and another authentication method may also be used.

Conditions for performing various verification processes may be set out appropriately in accordance with the content of vehicle control performed when verification is successful. Conditions for performing the verification for starting described above or the like are only exemplary and may be set out appropriately.

It is assumed that the challenge signal in the present embodiment includes at least verification situation information showing to which one of a challenge signal for vehicle interior verification and a challenge signal for vehicle exterior verification the challenge signal corresponds. The verification situation information allows the portable device 200 to recognize the situation in which verification is performed when receiving the challenge signal. The challenge signal for vehicle exterior verification corresponds to a vehicle exterior verification signal and the challenge signal for vehicle interior verification corresponds to a vehicle interior verification signal.

In another mode, the verification situation information may also be information showing the type of vehicle control to be performed in response to the challenge signal. The vehicle control mentioned herein indicates the unlocking of the doors, the locking of the doors, the starting of the engine, or the like.

The RKE processing unit F4 performs a process intended to be performed in the vehicle to implement the RKE system described above. Specifically, the RKE processing unit F4 analyzes the content of a command signal transmitted from the portable device 200 and performs vehicle control corresponding to the command signal in association with the body ECU 160 or the like. Examples of the vehicle control corresponding to the command signal include the locking/unlocking of the doors, the turning ON of illumination, the starting of the air-conditioning system mounted in the vehicle, or the like.

<Configuration of Portable Device 200>

Next, a description will be given of a configuration of the portable device 200. As shown in FIG. 1, the portable device 200 includes a portable-device reception antenna 210, a reception unit 220, the switches 230, a portable-device control unit 240, a transmission unit 250, an output adjustment unit 260, and a portable-device transmission antenna 270. The portable-device control unit 240 is communicatively connected to each of the reception unit 220, the switches 230, the transmission unit 250, and the output adjustment unit 260.

The portable-device reception antenna 210 is an antenna for receiving a radio wave in the LF band. The portable-device reception antenna 210 is connected to the reception unit 220 to convert the received radio wave to an electric signal and output the electric signal to the reception unit 220.

The reception unit 220 performs a predetermined process such as analog-to-digital conversion, demodulation, or decoding on a signal input from the portable-device reception antenna 210 to extract the data included in the received signal. The reception unit 220 provides the extracted data to the portable-device control unit 240. The reception unit 220 corresponds to a portable-device reception unit.

The switches 230 are switches for the user to use the function of the RKE system. For example, the portable device 200 includes, as the switches 230, the switch 230 for locking all the doors and the switch 230 for unlocking all the doors. When pressed by the user, the various switches 230 output control signals indicative of the pressing of the switches 230 to the portable-device control unit 240.

Each of the control signals input from the switches 230 allow the portable-device control unit 240 to detect the user operation performed to control the state of locking such as the locking/unlocking of the various doors provided in the vehicle and also specify the content of the given instruction. Note that, in FIG. 1, for the sake of convenience, only the two switches 230 are illustrated, but the number of the switches 230 is not limited to 2. For example, the switch 230 which gives an instruction to unlock only the trunk door may also be provided. The switches 230 correspond to an operation detection unit.

The portable-device control unit 240 includes a microcomputer including a CPU, a RAM, a ROM, an I/O, and the like as a main component. The ROM stores a program (hereinafter referred to as a portable-device control program) for causing a typical microcomputer to function as the portable-device control unit 240.

The portable-device control unit 240 performs a process intended to be performed in the portable device to implement the smart entry system and the like through the execution of the portable-device control program stored in the ROM by the CPU. Note that the ROM stores the vehicle ID in addition to the foregoing program. The detailed function of the portable-device control unit 240 will be separately described later.

The transmission unit 250 performs a predetermined process such as coding, modulation, or digital-to-analog conversion on a baseband signal input from the portable-device control unit 240 to convert the baseband signal to a carrier wave signal. Then, the transmission unit 250 outputs the generated carrier wave signal to the output adjustment unit 260. The transmission unit 250 corresponds to a portable-device transmission unit.

The output adjustment unit 260 is electrically connected to the portable-device control unit 240, the transmission unit 250, and the portable-device transmission antenna 270. The output adjustment unit 260 adjusts the power of an electric signal input from the transmission unit 250 to a level indicated by the portable-device control unit 240 and outputs the electric signal to the portable-device transmission antenna 270.

The portable-device control unit 240 allows the output adjustment unit 260 to adjust the output level (i.e., transmission power) of the signal to be transmitted to the in-vehicle system 100 to any level within a range which can be set by the output adjustment unit 260. The output adjustment unit 260 in the present embodiment may appropriately be configured to be able to adjust the output level to at least three levels, i.e., a default level, a vehicle exterior response level, and a vehicle interior response level each described later.

The output adjustment unit 260 may appropriately be implemented using a known attenuator which attenuates a signal or a variable gain amplifier having an adjustable amplification degree. For example, the output adjustment unit 260 may be configured appropriately to adjust the output level by connecting or disconnecting two attenuators having different attenuation levels to or from a signal propagation system using a switch. The output adjustment unit 260 may also be configured appropriately to allow the signal to be transmitted at the default level when the two attenuators are disconnected from the signal propagation system.

The portable-device transmission antenna 270 converts a signal input from the output adjustment unit 260 to a radio wave in the RF band and emits the radio wave into a space.

<About Function of Portable-Device Control Unit 240>

Figure 3:
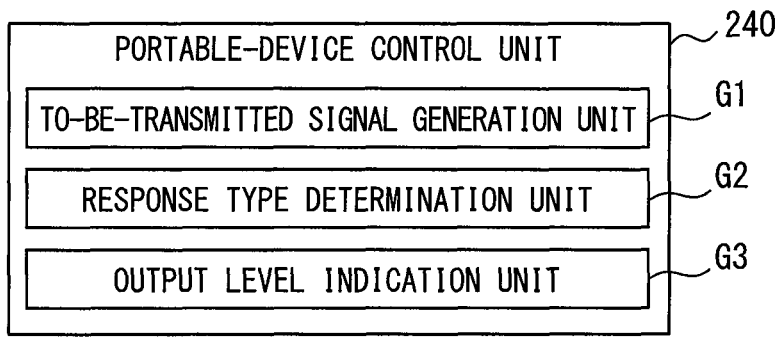
FIG. 3 is a block diagram showing an example of a schematic configuration of a portable-device control unit.

As shown in FIG. 3, the portable-device control unit 240 includes, as functional blocks implemented through the execution of the portable-device control program described above, a to-be-transmitted signal generation unit G1, a response type determination unit G2, and an output level indication unit G3. Note that any or all of the functional blocks included in the portable-device control unit 240 may also be implemented as hardware using one or a plurality of ICs or the like.

The to-be-transmitted signal generation unit G1 generates a signal to be transmitted to the in-vehicle system 100 and outputs the generated signal to the transmission unit 250. For example, when the reception unit 220 receives the signal transmitted from the in-vehicle system 100 such as the polling signal or the challenge signal, the to-be-transmitted signal generation unit G1 generates a predetermined signal to be transmitted as a response to the received signal and outputs the predetermined signal to the transmission unit 250. For example, when the reception unit 220 receives the challenge signal, the to-be-transmitted signal generation unit G1 generates a response signal including a code resulting from the coding of the vehicle ID.

When a control signal indicative of the pressing of any of the switches 230 by the user is input from the switch 230, the to-be-transmitted signal generation unit G1 generates a command signal including an instruction to perform the vehicle control corresponding to the switch 230 that has output the control signal. For example, when the switch 230 for unlocking all the doors is pressed, the to-be-transmitted signal generation unit G1 generates a command signal including an instruction to unlock all the doors and outputs the command signal to the transmission unit 250.

When the reception unit 220 receives the challenge signal, the response type determination unit G2 selectively determines to which one the challenge signal for vehicle interior verification and the challenge signal for vehicle exterior verification the received challenge signal corresponds on the basis of the verification situation information included in the challenge signal. Then, on the basis of the result of the selective determination, the response type determination unit G2 determines to which one of the response signal for vehicle interior verification and the response signal for vehicle exterior verification the response signal to be transmitted from the portable device 200 corresponds. The result of the determination is provided to the output level indication unit G3.

The output level indication unit G3 determines the objective value of the output level in accordance with the type of the signal to be transmitted from the portable device 200. Then, the output level indication unit G3 indicates the objective value of the output level to the output adjustment unit 260. The output adjustment unit 260 changes the attenuation degree and amplification degree of the signal on the basis of the indication by the output level indication unit G3 such that the output level reaches the objective value. That is, the output level indication unit G3 cooperates with the output adjustment unit 260 to adjust the output level of the signal to be transmitted from the portable device 200 to the in-vehicle system 100 to a level in accordance with the type of the signal to be transmitted from the portable device 200.

Specifically, the output level indication unit G3 cooperates with the output adjustment unit 260 to cause the command signal to be transmitted at the predetermined default level. The output level indication unit G3 also causes the response signal for vehicle exterior verification to be transmitted at the vehicle exterior response level lower than the default level. The output level indication unit G3 also causes the response signal for vehicle interior verification to be transmitted at the vehicle interior response level lower than the vehicle exterior response level. That is, the respective output levels of the various signals are progressively reduced in order of the command signal, the response signal for vehicle exterior verification, and the response signal for vehicle interior verification.

The specific values of the default level, the vehicle exterior response level, and the vehicle interior response level may be set out appropriately. Since the default level is the output level used when the command signal is transmitted, the default level is preferably maximized within a range allowed within the limitations of the Radio Law or the like.

For example, the default level may appropriately be set such that the distance covered by a signal in a field of view is about several tens of meters (e.g., 30 meters). Note that the distance covered by a signal in a field of view mentioned herein corresponds to the upper limit value of a distance which allows the signal transmitted from the portable device 200 to be received at a demodulable level by the in-vehicle system 100 in an environment in which there is no other object that inhibits the propagation of a radio wave between the portable device 200 and the in-vehicle system 100.

The vehicle exterior response level may be set appropriately such that the distance covered by a signal in a field of view is about 5 to 10 meters. The vehicle exterior response level may be set appropriately such that the distance covered by a signal in a field of view is about several meters (e.g., 3 meters).

Note that, in the present embodiment, by way of example, for the response signal for vehicle exterior verification and the response signal for vehicle interior verification, different output levels are set. However, the output levels of the response signals are not limited thereto. In another mode, for the response signal for vehicle exterior verification and the response signal for vehicle interior verification, an equal output level may also be set. However, in that case, the output level of each of the response signals is set lower than the output level of the command signal.

Note that, among the signals transmitted from the portable device 200 to implement the smart entry system, the signal not including the ID code, such as the response signal responding to the polling signal, may be transmitted either at the default level or at the vehicle exterior response level.

<Transmission-Related Process>

Figure 4:
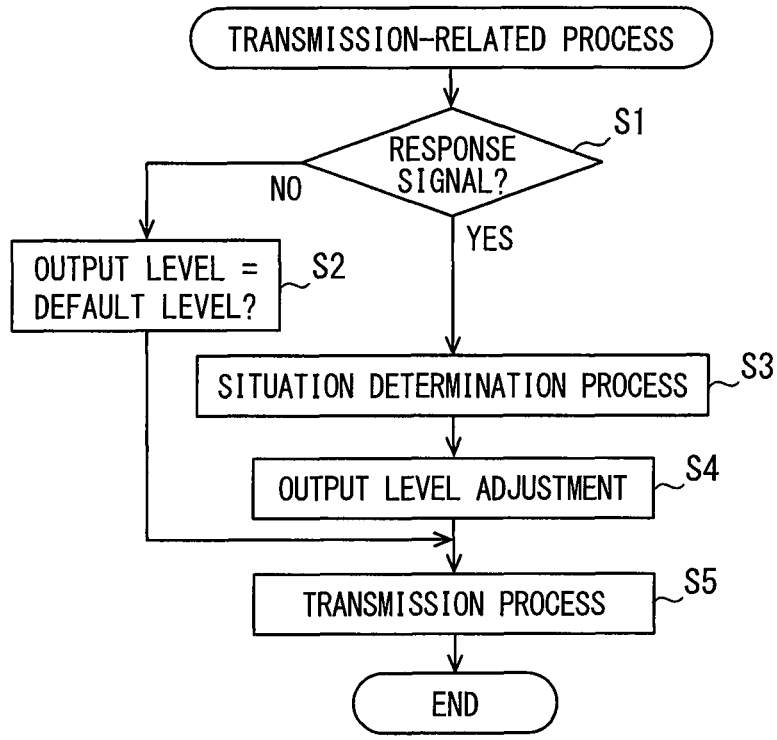
FIG. 4 is a flow chart illustrating a transmission-related process.

Next, using the flow chart shown in FIG. 4, a description will be given of a sequential process (hereinafter referred to as a transmission-related process) which is performed when the portable device 200 transmits a signal to the in-vehicle system 100. The flow chart shown in FIG. 4 may be started appropriately when, e.g., the to-be-transmitted signal generation unit G1 generates a signal.

First, in Step S1, the output level indication unit G3 determines whether or not the signal to be transmitted is either of the response signals. When the signal to be transmitted is either of the response signals, the output level indication unit G3 makes an affirmative determination in Step S1, and the process moves to Step S3. On the other hand, when the signal to be transmitted is none of the response signals, the output level indication unit G3 makes a negative determination in Step S1, and the process moves to Step S2.

In Step S2, the output level indication unit G3 gives an instruction to set the output level to the default level to the output adjustment unit 260, and the process moves to Step S5.

In Step S3, the response type determination unit G2 determines to which one of the response signal for vehicle exterior verification and the response signal for vehicle interior verification the response signal generated this time by the to-be-transmitted signal generation unit G1 corresponds on the basis of the verification situation information included in the challenge signal received by the reception unit 220. Then, the response type determination unit G2 provides the result of the determination to the output level indication unit G3, and the process moves to Step S4.

In Step S4, the output level indication unit G3 adjusts the output level in the output adjustment unit 260 on the basis of the result of the determination in Step S3, and the process moves to Step S5. Specifically, as a result of the determination in Step S3, when the response signal to be transmitted this time is the response signal for vehicle exterior verification, the output level indication unit G3 sets the output level in the output adjustment unit 260 to the vehicle exterior response level, and the process moves to Step S5. On the other hand, when the response signal to be transmitted this time is the response signal for vehicle interior verification, the output level indication unit G3 sets the output level in the output adjustment unit 260 to the vehicle interior response level, and the process moves to Step S5.

In Step S5, the to-be-transmitted signal generation unit G1 outputs the generated to-be-transmitted signal to the transmission unit 250. The to-be-transmitted signal output to the transmission unit 250 is modulated to the carrier wave signal, which is then adjusted to a predetermined output level in the output adjustment unit 260 and input to the portable-device transmission antenna 270. Then, the carrier wave signal is emitted as a radio wave from the portable-device transmission antenna 270.

Note that the order or the like of the individual steps of the transmission-related process described above is only exemplary, and is not limited to the order shown above. It is sufficient for the output level of the carrier wave signal corresponding to the signal generated by the to-be-transmitted signal generation unit G1 to be adjusted to a level corresponding to the type of the signal before the carrier wave signal is output from the transmission unit 250.

Summary of First Embodiment

In the configuration described above, when transmitting the command signal, the portable device 200 transmits the command signal at the predetermined default level. On the other hand, when transmitting either of the response signals, the portable device 200 transmits the response signal at the output level lower than the default level. In addition, the portable device 200 transmits the response signal for vehicle exterior verification at the vehicle exterior response level, while transmitting the response signal for vehicle interior verification at the vehicle interior response level lower than the vehicle exterior response level.

Figure 5:
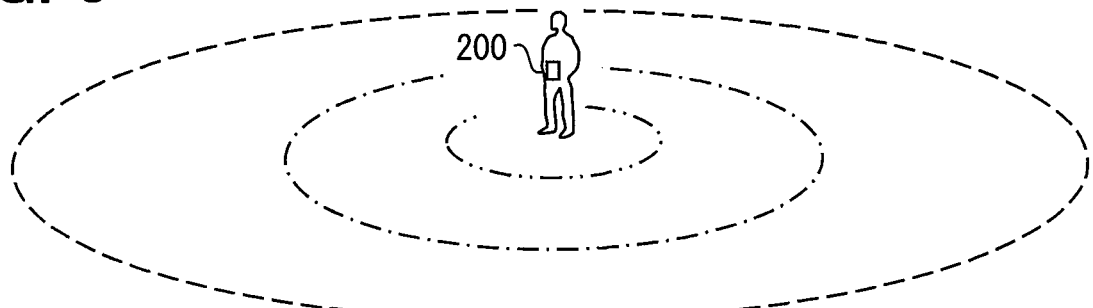
FIG. 5 is a diagram conceptually showing the ranges reached by signals on a per-output-level basis.

In such an operation, as shown in FIG. 5, the command signal for the RKE system propagates to a relatively distant place, while the propagation distance of the response signal for the smart entry system is reduced compared to that of the command signal. This can reduce the risk that the response signal may be relayed by a repeater. As a result, it is possible to inhibit code verification unintended by the authorized user from being successfully made.

Note that, in FIG. 5, the range enclosed by the broken line, the range enclosed by the dot-dash line, and the range enclosed by the two-dot-dash line conceptually represent the range reached by the command signal, the range reached by the response signal for vehicle exterior verification, and the range reached by the response signal for vehicle interior verification, respectively.

In the configuration of the present embodiment, the range reached by the response signal for vehicle interior verification is smaller than the range reached by the response signal for vehicle exterior verification. Accordingly, even if the response signal for vehicle exterior verification is relayed by the relay, the probability that the response signal for vehicle interior verification is also relayed by the relay is low. That is, in the configuration in the present embodiment, even when the doors are unlocked by a third party, it is possible to reduce the risk that the engine may be started by the third party.

Needless to say, since the range reached by the response signal for vehicle exterior verification is set smaller than the range reached by the command signal for the RKE system as described above, the foregoing configuration has allowed a reduction in the probability that the doors are unlocked. That is, the foregoing configuration corresponds to taking a two-stage defense against a verification process unintended by the user.

In addition, the command signal for the RKE system is transmitted at the predetermined default level. Consequently, the foregoing configuration can enhance the security of the vehicle, while satisfying the need to deliver the command signal for the RKE system to a place as distant as possible.

Note that, when attention is to be focused on preventing the relaying by the relay, it is preferable to set the range reached by the response signal for vehicle exterior verification as small as the range reached by the response signal for vehicle interior verification. However, when the range reached by the response signal for vehicle exterior verification is set excessively small, the verification for riding may not be completed before the user coming closer to the vehicle arrives to the vehicle.

When the verification for riding has not been completed before the user coming closer to the vehicle arrives to the vehicle, even if the user touches the touch sensor provided in each of the door handles, the door is not unlocked. That is, when the range reached by the response signal for vehicle exterior verification is set excessively small, convenience for the user is reduced. Accordingly, the response signal for vehicle exterior verification preferably has a certain degree of strength.

Note that, by way of example, the present embodiment shows the mode in which the output level of the signal (hereinafter referred to as an RF signal) in the RF band transmitted from the portable device 200 is adjusted to the three levels, i.e., the default level, the vehicle exterior response level, and the vehicle interior response level. However, the output level of the RF signal is not limited thereto. The output level of the RF signal may also be adjusted to four levels, i.e., the default level, a response level for riding, a response level for locking, and the vehicle interior response level. It is appropriate that the response level for riding is equivalent to the vehicle exterior response level mentioned above and the response level for locking is any level in a range lower than the response level for riding and the vehicle interior response level or higher.

With regard to the modification described above, the output level of the response signal is preferably set out appropriately in accordance with the content of control performed as a result of the verification. Specifically, the mode may appropriately be such that a response signal corresponding to the content of control which may cause more significant damage when an unauthorized verification process is successfully performed has a lower output level. Note that the unauthorized verification made successfully mentioned herein indicates an event such that verification is successfully made by the challenge signal or the response signal relayed by the relay.

While the embodiment has been shown heretofore by way of example, the embodiment is not limited to the embodiment described above. The technical idea of the present disclosure can also be embodied in various modifications described below and can also be variously modified and practiced in modes other than those described below within the range not departed from the gist thereof.

Note that members having the same functions as those of the members described above in the embodiment are given the same reference numerals and a description of the members is omitted. When only a portion of a configuration is mentioned, the configuration in the previously described embodiment is applicable to the other portion of the configuration.

<First Modification>

Next, a description will be given of a modification 1 (hereinafter referred to as a first modification) of the embodiment described above. The difference between the first modification and the embodiment described above lies in the procedure of the verification process. The following will mainly describe a portion related to the difference. First, a description will be given of the portable device 200.

<Configuration and Operation of Portable Device 200 in First Modification>

Figure 6:
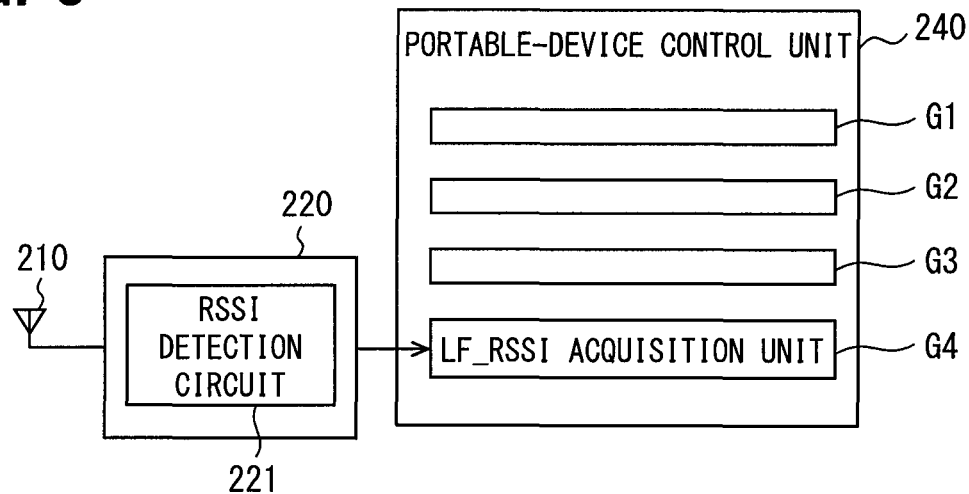
FIG. 6 is a block diagram for illustrating a configuration of a portable device in a first modification.

As shown in FIG. 6, the reception unit 220 included in the portable device 200 in the first modification includes an RSSI circuit 221 which detects a received signal strength (RRSI for Received Signal Strength Indication) as the strength of the signal received by the portable-device reception antenna 210. The RSSI circuit 221 may be implemented appropriately using a known circuit configuration. The RSSI detected by the RSSI circuit 221 is provided to the portable-device control unit 240.

Note that the RSSI detected by the RSSI circuit 221 is the RSSI of an LF signal. Accordingly, for the sake of convenience, the RSSI detected by the RSSI circuit 221 is hereinafter referred to also as LF_RSSI. The portable-device control unit 240 includes an LF_RSSI acquisition unit G4 which sequentially acquires the LF_RSSI detected by the RSSI circuit 221. The RSSI acquired by the LF_RSSI acquisition unit G4 is stored in the RAM for a given period of time. This allows the RSSI of the received challenge signal to be specified. The LF_RSSI acquisition unit G4 corresponds to a portable-device reception strength acquisition unit.

When the reception unit 220 receives the challenge signal, the to-be-transmitted signal generation unit G1 in the first modification generates a response signal including the RSSI detected by the RSSI circuit 221 in response to the challenge signal. That is, the portable device 200 in the first modification is configured to return the response signal including the RSSI of the received challenge signal at a predetermined output level to the in-vehicle system 100. The LF_RSSI included in the challenge signal corresponds to distance-related information.

Figure 7:
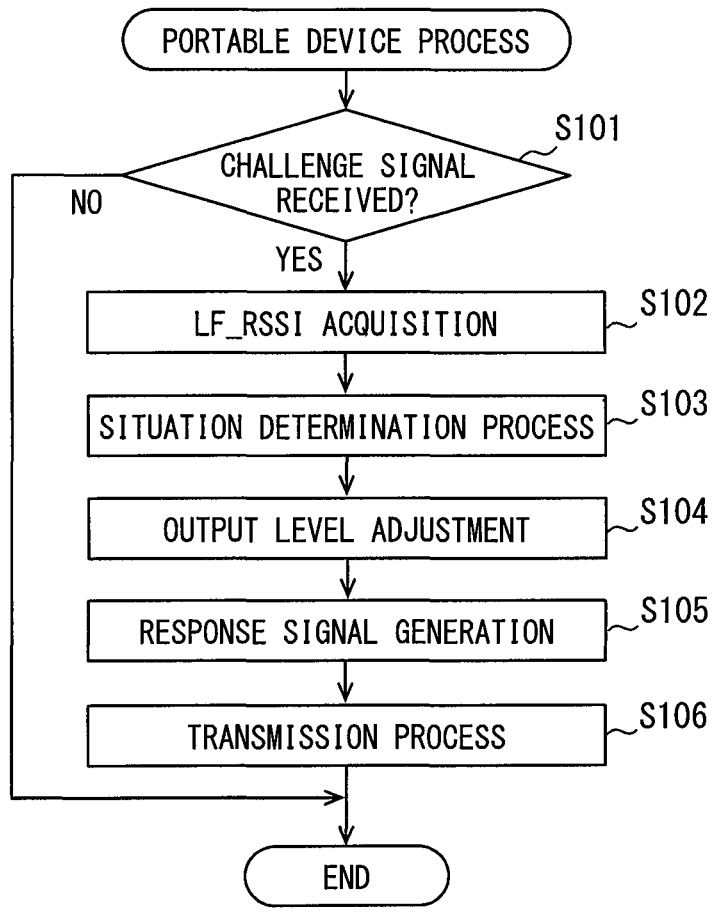
FIG. 7 is a flow chart for illustrating a portable-device process performed by a portable-device control unit in the first modification.

Using the flow chart shown in FIG. 7, a description will be given herein of a sequential process (hereinafter referred to as a response transmission-related process) which is performed when the portable-device control unit 240 returns the response signal. The flow chart may be started appropriately when, e.g., the reception unit 220 receives the LF signal from the in-vehicle system 100.

First, in Step S101, it is determined whether or not the received signal is the challenge signal. When the received signal is the challenge signal, the portable-device control unit 240 makes an affirmative determination in Step S101, and the process moves to Step S102. On the other hand, when the received signal is not the challenge signal, the portable-device control unit 240 makes a negative determination in Step S101 to thus end the current flow. Note that, when the portable-device control unit 240 makes the negative determination in Step S101, the portable-device control unit 240 performs an additional process of generating a response signal responding to the received signal and transmitting the generated response signal at a predetermined output level.

In Step S102, the LF_RSSI acquisition unit G4 acquires the RSSI of the challenge signal received this time from the RSSI circuit 221, and the process moves to Step S103. In Step S103, the response type determination unit G2 determines to which one of the response signal for vehicle exterior verification and the response signal for vehicle interior verification the response signal generated this time by the to-be-transmitted signal generation unit G1 corresponds on the basis of the verification situation information included in the challenge signal received by the reception unit 220. Then, the response type determination unit G2 provides the result of the determination to the output level indication unit G3, and the process moves to Step S104.

In Step S104, the output level indication unit G3 adjusts the output level of the output adjustment unit 260 on the basis of the result of the determination in Step S103, and the process moves to Step S105. Specifically, when the signal generated by the to-be-transmitted signal generation unit G1 is the response signal for vehicle exterior verification as a result of the determination in Step S103, the output level indication unit G3 sets the output level in the output adjustment unit 260 to the vehicle exterior response level, and the process moves to S105. On the other hand, when the signal generated by the to-be-transmitted signal generation unit G1 is the response signal for vehicle interior verification, the output level indication unit G3 sets the output level in the output adjustment unit 260 to the vehicle interior response level, and the process moves to Step S105.

In Step S105, the to-be-transmitted signal generation unit G1 generates the response signal including the RSSI acquired by the LF_RSSI acquisition unit G4 in Step S102, and the process moves to Step S106. In Step S106, the to-be-transmitted signal generation unit G1 outputs the generated response signal to the transmission unit 250 to thus end the current flow. Note that the response signal input to the transmission unit 250 is modulated to the carrier wave signal, which is then adjusted to a predetermined output level in the output adjustment unit 260 and transmitted from the portable-device transmission antenna 270.

<Configuration and Operation of in-Vehicle System 100 in First Modification>

Next, a description will be given of the configuration and operation of the in-vehicle system 100 in the first modification. The difference between the in-vehicle system 100 in the first modification and that in the previously described embodiment lies in the reception unit 112 and the vehicle control unit 111 which are included in the verification ECU 110.

Figure 8:
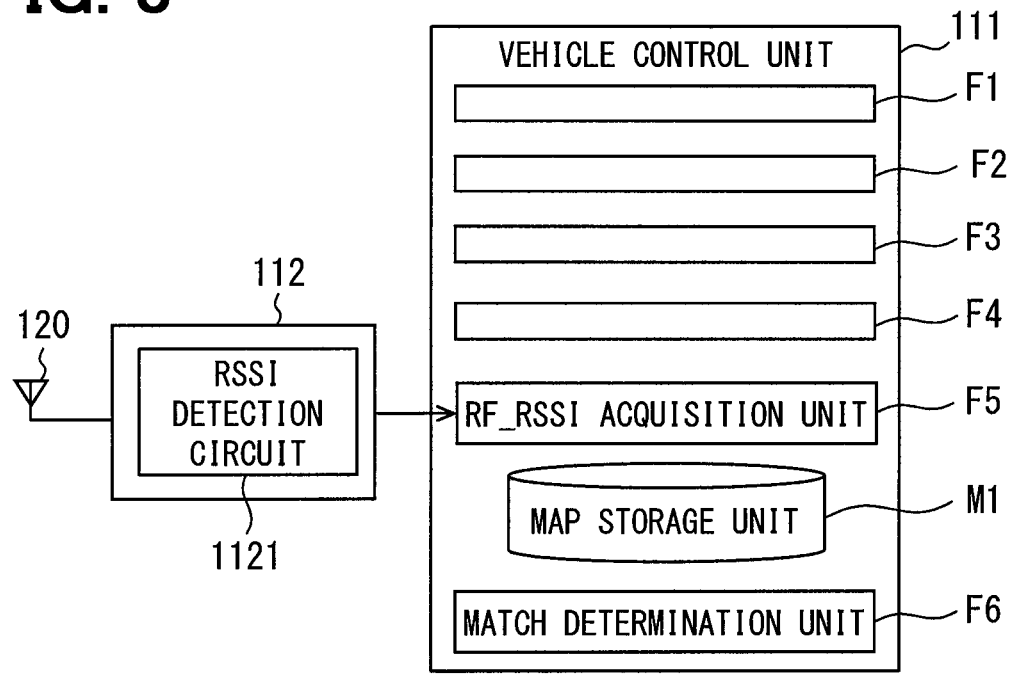
FIG. 8 is a block diagram for illustrating a configuration of a verification ECU in the first modification.

As shown in FIG. 8, the reception unit 112 in the first modification includes an RSSI circuit 1121 which detects a received signal strength (i.e., RSSI) as the strength of the signal received by the vehicle reception antenna 120. The RSSI circuit 1121 may appropriately be implemented using a known circuit configuration. The RSSI detected by the RSSI circuit 1121 is provided to the portable-device control unit 240.

Note that the RSSI detected by the RSSI circuit 1121 is the RSSI of the RF signal. Accordingly, the RSSI detected by the RSSI circuit 1121 will be hereinafter referred to also as RF_RSSI.

The vehicle control unit 111 in the first modification also includes, in addition to the various functional blocks described above, an RF_RSSI acquisition unit F5, a map storage unit M1, and a match determination unit F6. Each of the RF_RSSI acquisition unit F5 and the match determination unit F6 may be implemented as software or as hardware using one or a plurality of ICs. The map storage unit M1 may be implemented appropriately using a portion of the storage region included in the RAM.

The RF_RSSI acquisition unit F5 sequentially acquires the RF_RSSI detected by the RSSI circuit 1121. The acquired RSSI is stored in the RAM for a given period of time. This allows the RSSI of the received response signal to be specified, as described later. The RF_RSSI acquisition unit F5 corresponds to an in-vehicle device reception strength acquisition unit.

The map storage unit M1 stores an LF_RSSI map, a vehicle exterior RF_RSSI map, and a vehicle interior RF_RSSI map. The LF_RSSI map is data showing the correspondence relationship between the distance (hereinafter referred to as an inter-terminal distance) between the vehicle and the portable device 200 and the RSSI of the challenge signal in the portable device 200. The vehicle exterior RF_RSSI map is data showing the correspondence relationship between the RSSI of the response signal responding to the challenge signal for vehicle exterior verification and the inter-terminal distance. The vehicle interior RF_RSSI map is data showing the correspondence relationship between the RSSI of the response signal responding to the challenge signal for vehicle interior verification and the inter-terminal distance.

Figure 9:
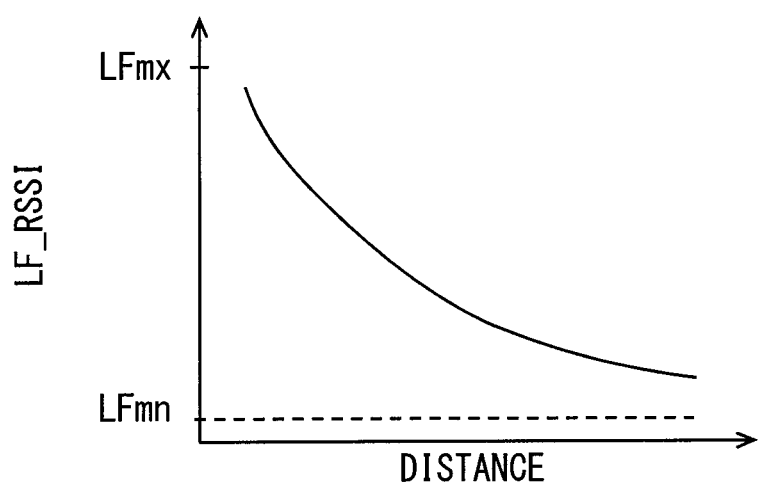
FIG. 9 is a diagram for illustrating an LF_RSSI map.

In general, a wireless signal gradually attenuates as the wireless signal propagates in a space so that, as the distance between the vehicle and the portable device 200 is longer, the RSSI of the challenge signal in the portable device 200 is lower, as shown in FIG. 9. The LF_RSSI map is data showing such the correspondence relationship between the inter-terminal distance and the RSSI of the challenge signal in the portable device 200 as shown in FIG. 9. The LF_RSSI map may be produced appropriately on the basis of a real test, simulation, or the like.

Note that the abscissa axis of the graph shown in FIG. 9 shows the inter-terminal distance, while the ordinate axis of the graph shows the LF_RSSI. The LFmx on the ordinate axis shows the maximum value of the RSSI of the challenge signal that can be observed by the portable device 200. The LFmx is determined by the transmission power of the challenge signal transmitted from the in-vehicle system 100. The LFmn on the ordinate axis shows a level assumed as the lower limit value of the signal strength which allows the portable device 200 to normally decode the challenge signal.

Figure 10:
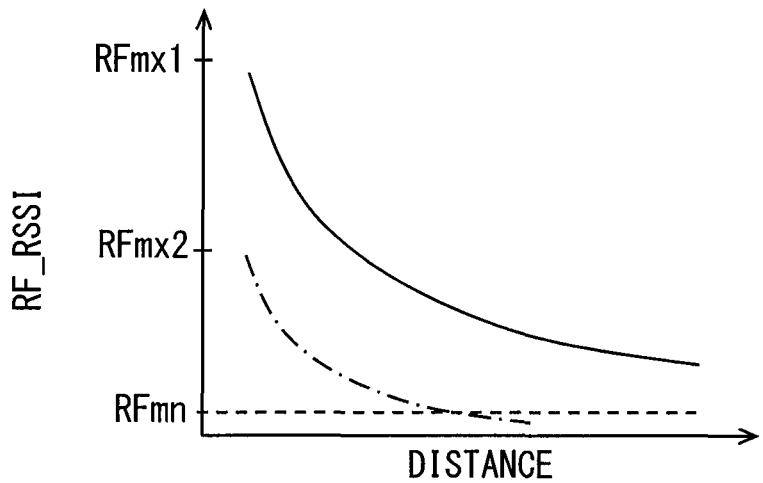
FIG. 10 is a diagram for illustrating an RF_RSSI map.

FIG. 10 conceptually shows the correspondence relationship between the inter-terminal distance and the RF_RSSI shown by each of the vehicle exterior RF_RSSI map and the vehicle interior RF_RSSI map. The graph shown by the solid line in FIG. 10 shows the correspondence relationship between the inter-terminal distance and the RF_RSSI in the vehicle exterior RF_RSSI map. The graph shown by the dot-dash line in FIG. 10 shows the correspondence relationship between the inter-terminal distance and the RF_RSSI in the vehicle interior RF_RSSI map.

The RFmx1 on the ordinate axis shows the maximum value of the RSSI of the response signal for vehicle exterior verification that can be observed by the in-vehicle system 100, while the RFmx2 on the ordinate axis shows the maximum value of the RSSI of the response signal for vehicle interior verification. The RFmx2 corresponds to a vehicle interior reception strength maximum value. On the other hand, the RFmn shows a level assumed as the lower limit value of a signal strength which allows the in-vehicle system 100 to normally decode the response signal.

Each of the RFmx1 and the RFmx2 is determined by the transmission power (i.e., output level) when the portable device 200 transmits the response signal. Specifically, the RFmx1 is determined by the vehicle exterior response level, while the RFmx2 is determined by the vehicle interior response level.

When the transmission powers are different, the correspondence relationships between the RF_RSSI and the inter-terminal distance are naturally different. In the first modification also, in the same manner as in the embodiment described above, the output level of the response signal for vehicle interior verification is set lower than the output level of the response signal for vehicle exterior verification. That is, the corresponding relationship between the inter-terminal distance and the RF_RSSI of the response signal for vehicle exterior verification is different from that of the response signal for vehicle interior verification.

Accordingly, the map storage unit M1 in the present modification stores, as data (hereinafter referred to as an RF_RSSI map) showing the correspondence relationship between the RF_RSSI and the inter-terminal distance, two types of map data, i.e., the vehicle exterior RF_RSSI map and the vehicle interior RF_RSSI map. Note that, as will be described later in the third and fourth modifications, the mode may also be such that the map storage unit M1 stores only one type of map as data showing the correspondence relationship between the RF_RSSI and the inter-terminal distance.

In the present embodiment, by way of example, the mode is such that the vehicle control unit 111 stores the data showing the correspondence relationship between the LF_RSSI and the inter-terminal distance and the correspondence relationship between the RF_RSSI and the inter-terminal distance in the form of maps, but the form in which the correspondence relationships are shown is not limited thereto. The correspondence relationships between the various RSSIs and the inter-terminal distance may also be shown in the form of functions, tables, or the like. The vehicle exterior RF_RSSI map corresponds to a vehicle exterior reception strength map. The vehicle interior RF_RSSI map corresponds to a vehicle interior reception strength map. The LF_RSSI map corresponds to a portable-device reception strength map.

Note that the various map data is originally stored in a nonvolatile storage medium such as the ROM. The various map data stored in the ROM is read out by the CPU, stored in the RAM, and used for various processes. Of the storage region included in the RAM, the data region storing the map data read out of the ROM corresponds to the map storage unit M1. The various maps described above are used by the match determination unit F6.

The match determination unit F6 uses the RF_RSSI map stored in the map storage unit M1 and the RSSI of the response signal acquired by the RF_RSSI acquisition unit F5 to estimate a return route distance as the inter-terminal distance.

Note that the RF_RSSI map used when the return route distance is estimated is assumed to correspond to the type of the challenge signal serving as a trigger for the response signal. That is, for the response signal returned in response to the challenge signal for vehicle exterior verification, the return route distance is estimated using the vehicle exterior RF_RSSI map and, for the response signal returned in response to the challenge signal for vehicle interior verification, the return route distance is estimated using the vehicle interior RF_RSSI map.

The return route distance as the inter-terminal distance is also estimated using the LF_RSSI map and the LF_RSSI included in the response signal. Then, it is determined whether or not the return route distance matches an outward route distance. The details of the operation by the match determination unit F6 will be separately described later.

<Verification Process in First Modification>

Figure 11:
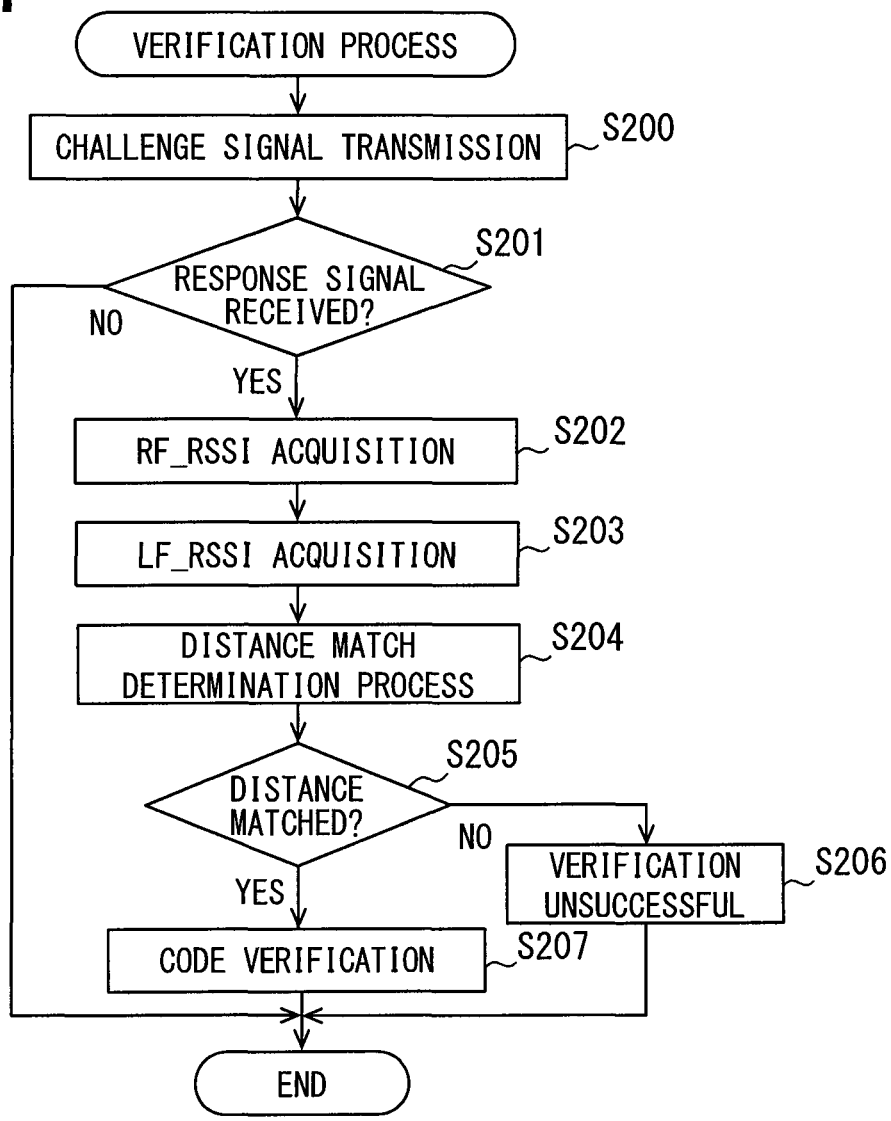
FIG. 11 is a flow chart for illustrating a verification process performed by a vehicle control unit in the first modification.

Using the flow chart shown in FIG. 11, a description will be given herein of the verification process performed by the vehicle control unit 111 in the first modification. The flow chart may be started appropriately when a predetermined condition for the vehicle control unit 111 to start the verification process is satisfied.

By way of example, a description will be given herein of the case where the vehicle control unit 111 performs a verification process as the verification for riding as a result of the satisfaction of the condition for performing the verification for riding. Note that the case where the verification process for riding is performed may be assumed appropriately to be the case where, e.g., a response to the polling signal is returned from the portable device 200.

First, in Step S200, the verification processing unit F3 cooperates with the communication processing unit F1, the transmission control unit 113, and the like to generate the challenge signal for vehicle exterior verification, and the process moves to Step S201. In Step S201, the communication processing unit F1 determines whether or not either of the response signals is received. When either of the response signals is received, the communication processing unit F1 makes an affirmative determination in Step S201, and the process moves to Step S202. On the other hand, when no response signal is received even after the lapse of a given time from the transmission of the challenge signal, the communication processing unit F1 makes a negative determination in Step S201 to thus end the current flow.

In Step S202, the LF_RSSI acquisition unit G4 acquires the RF_RSSI of the received response signal from the RSSI circuit 1121. Then, the LF_RSSI acquisition unit G4 provides the RF_RSSI to the match determination unit F6, and the process moves to Step S203. In Step S203, the match determination unit F6 reads out the LF_RSSI included in the received response signal, and the process moves to Step S204.

Figure 12:
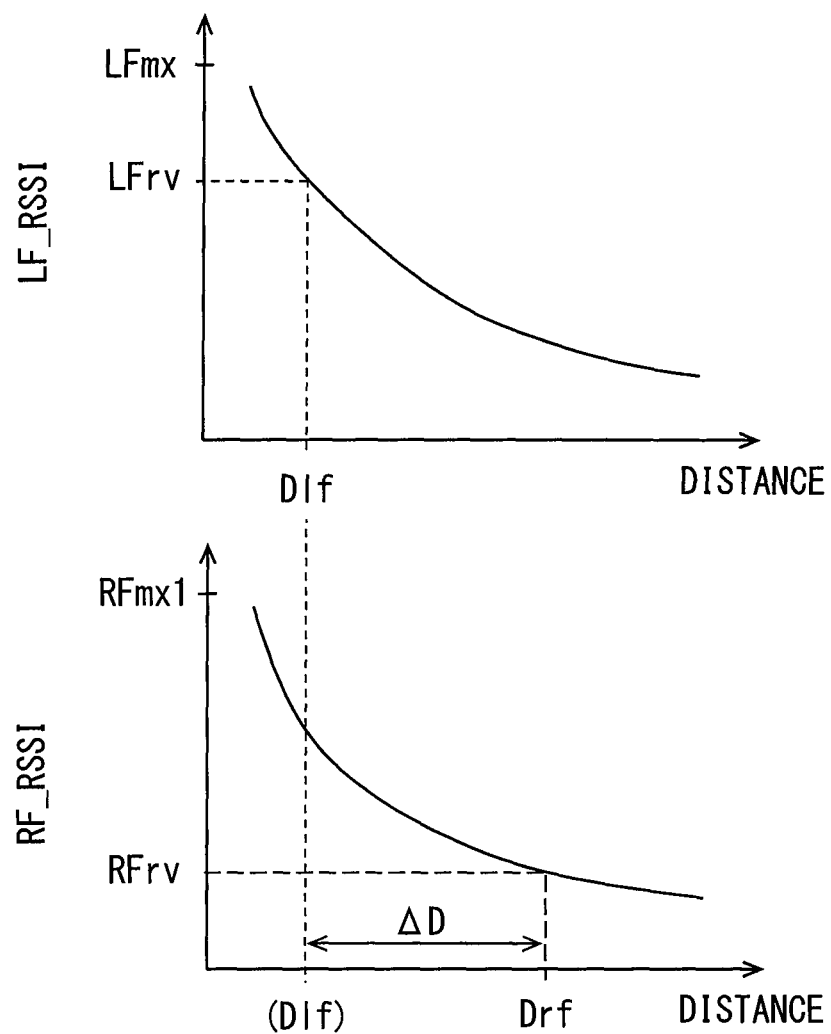
FIG. 12 is a diagram for illustrating a match determination process.

In Step S204, the match determination unit F6 performs a distance match determination process, and the process moves to Step S205. The distance match determination process in S204 will be described using FIG. 12. First, the match determination unit F6 uses the LF_RSSI map stored in the map storage unit M1 to estimate the return route distance from the LF_RSSI included in the response signal. The Dlf in FIG. 12 shows the return route distance corresponding to the case where the LF_RSSI is LFrv.

The match determination unit F6 also uses the vehicle exterior RF_RSSI map stored in the map storage unit M1 to estimate the outward route distance from the RF_RSSI of the challenge signal. The Drf in FIG. 12 shows the outward route distance corresponding to the case where the RF_RSSI is RFrv.

Then, the match determination unit F6 specifies the absolute value (hereinafter referred to as a degree of divergence) ΔD of the difference between the return route distance Dlf and the outward route distance Drf. When the degree of divergence ΔD is a predetermined tolerable threshold or more, the match determination unit F6 determines that there is no match between the return route distance Dlf and the outward route distance Drf. On the other hand, when the degree of divergence ΔD is less than the predetermined tolerable threshold, the match determination unit F6 determines that there is a match between the return route distance Dlf and the outward route distance Drf.

The tolerable threshold used herein corresponds to the upper limit value in a range which tolerates the distance between the return route distance Dlf and the outward route distance Drf as an error occurring in estimating various distances. Since the RSSIs of various signals naturally fluctuate under the influence of a multipath or the like, the distance estimated from the RSSI includes an error. In addition, since the RF band and the LF band have different radio wave propagation properties, the propagation environments of the RF band and the LF band differently affect the RSSIs. The tolerable threshold used herein is a threshold which absorbs the degree of divergence resulting from various causes, and a specific value of the tolerable threshold may be set out appropriately.

In the match determination process described above, when the match determination unit F6 determines that there is a match between the return route distance Dlf and the outward route distance Drf, the match determination unit F6 makes an affirmative determination in Step S205, and the process moves to Step S207. On the other hand, when the match determination unit F6 determines that there is no match between the return route distance Dlf and the outward route distance Drf, the match determination unit F6 makes a negative determination in Step S205, and the process moves to Step S206.

In Step S206, the match determination unit F6 determines that the verification is unsuccessful to thus end the current flow. This is because the case where there is no match between the return route distance Dlf and the outward route distance Drf indicates the probability that, as will be described later, the challenge signal has been relayed by the relay 300 and has reached the portable device 200.

In Step S207, the ID code shown by the received response signal is compared to the ID code stored in the verification processing unit F3. That is, ID code verification is performed to thus end the current flow. When the verification is successful, as described above, the unlocking process is performed.

The foregoing has described the case where the verification for riding is performed as an example of the verification process, but a verification process in another situation (i.e., verification for starting) may also be performed appropriately in the same manner.

<Effects of First Modification>

In the configuration of the embodiment described above, the output level of the response signal for vehicle exterior verification is suppressed to the vehicle exterior response level. Consequently, the probability is low that the response signal responding to the challenge signal relayed by the relay 300 reaches the in-vehicle system 100.

Figure 13:
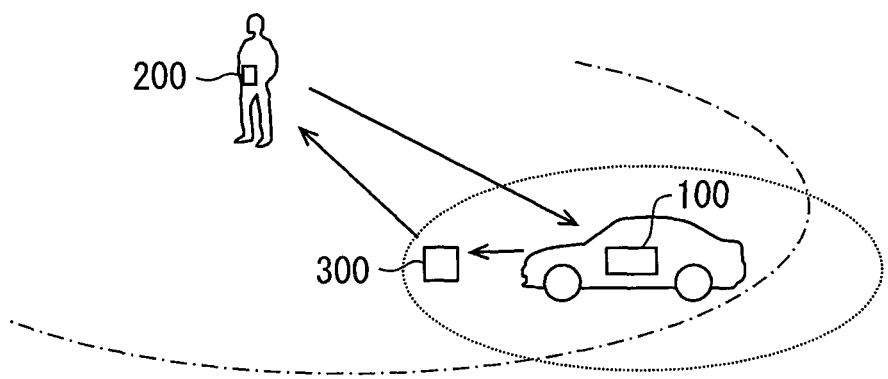
FIG. 13 is a diagram for illustrating the effects of the first modification.

However, when the distance between the portable device 200 and the vehicle is such as to be able to be covered even by the response signal at the vehicle exterior response level as shown in FIG. 13, the response signal responding to the challenge signal relayed by the relay 300 may possibly reach the in-vehicle system 100. Note that, in FIG. 13, the dot-dash line shows the range reached by the response signal for vehicle exterior verification, while the dotted line shows the wireless communication area of the in-vehicle system 100.

In the configuration in the first modification, in such a case also, it is possible to prevent the verification from being successfully made. The following is a specific example. In a situation as shown in FIG. 13, the challenge signal is amplified by the relay 300, and therefore the LF_RSSI assumedly has a large value. That is, the estimated outward route distance has a relatively small value. On the other hand, since the response signal in the RF band is not amplified by the relay 300, the return route distance estimated from the RF_RSSI corresponds to a real distance. That is, the return route distance has a relatively large value.

That is, the case where the return route distance does not match the outward route distance indicates a situation in which the challenge signal is relayed. Note that, since the relay 300 used for a relay attack typically amplifies a signal in the LF band, the response signal which is a signal in the RF band is not amplified by the relay 300.

In the configuration in the first modification, when determining that there is no match between the two distances, the match determination unit F6 does not perform ID code verification and determines that the verification is unsuccessful. Accordingly, even if the portable device 200 and the in-vehicle system 100 have a positional relationship between each other such that the response signal responding to the challenge signal repeated by the relay 300 reaches the in-vehicle system 100, it is possible to prevent unauthorized verification from being successfully made.

<Second Modification>

The first modification described above is in the mode in which the inter-terminal distance is specifically estimated from the various RSSIs and whether or not there is a contradiction between the outward route distance and the return route distance is determined using the degree of divergence ΔD between each other, but the mode is not limited thereto.

For example, the mode may also be such that the inter-terminal distance is categorized into two distance levels, i.e., a short distance level and a long distance level, and the match determination unit F6 selectively determines to which one of the distance levels the inter-terminal distance estimated from the RSSIs corresponds. When there is no match between the distance level estimated from the LF_RSSI and the distance level estimated from the RF_RSSI, the match determination unit F6 may appropriately determine that there is no match for each of the distances. For example, the short distance level may appropriately be set to be less than 10 meters, while the long distance level may appropriately be set to be 10 meters or more. Note that the inter-terminal distance may also be subdivided into three or more levels.

<Third Modification>

In the first modification described above, by way of example, the mode is shown in which, as the RF_RSSI map, the two types of data, i.e., the vehicle exterior RF_RSSI map and the vehicle interior RF_RSSI map are stored. However, the RF_RSSI map is not limited thereto.

In another mode, the RF_RSSI map stored in the map storage unit M1 may also be one type, which is the vehicle exterior RF_RSSI map. In that case, the match determination unit F6 corrects the vehicle exterior RF_RSSI map using the ratio between the vehicle exterior response level and the vehicle interior response level to thus virtually generate the vehicle interior RF_RSSI map. The mode may appropriately be such that, for the RF_RSSI of the response signal during the vehicle interior verification, the return route distance is estimated using the corrected map.

The map corrected using the ratio between the vehicle exterior response level and the vehicle interior response level may appropriately be a map obtained by, e.g., multiplying the values of the RSSIs corresponding to the individual distances in the vehicle exterior RF_RSSI map by the value obtained by dividing the vehicle interior response level by the vehicle exterior response level. Note that, in still another mode, the RF_RSSI map stored in the map storage unit M1 may also be one type, which is the vehicle interior RF_RSSI map.

<Fourth Modification>

In the first modification described above, by way of example, the mode is shown in which whether or not there is a match between the outward route distance and the return route distance is determined during each of the vehicle exterior verification and the vehicle interior verification, but the mode is not limited thereto. The mode may also be such that whether or not there is a match between the outward route distance and the return route distance is determined only during the vehicle exterior verification. The following is the reason for this.

The vehicle interior response level is set to a sufficiently small value such that the distance to be covered by a signal is about several meters. Accordingly, the probability is extremely low that the response signal transmitted in response to the challenge signal relayed by the relay 300 actually reaches the in-vehicle system 100. This is because, during the vehicle interior verification, the need to determine whether or not there is a match between the distances is not so great as during the vehicle exterior verification.

In the case of a fourth modification also, the RF_RSSI map stored in the map storage unit M1 can be reduced to one type, which is the vehicle exterior RF_RSSI map.

<Fifth Modification>

In the first modification described above, the mode is such that the portable device 200 returns the response signal including the LF_RSSI of the received challenge signal. However, the mode is not limited thereto. The mode may also be such that the portable-device control unit 240 converts the LF_RSSI to the inter-terminal distance (i.e., the return route distance) using data equivalent to the LF_RSSI map and transmits the response signal including information on the outward route distance instead of the LF_RSSI. That is, the distance-related information may also be the outward route distance specified by the portable-device control unit 240 on the basis of the LF_RSSI.

<Sixth Modification>

In the first modification, when the RSSI of the response signal for vehicle exterior verification is RFmx1 or more, the verification processing unit F3 may also determine that the verification is unsuccessful. This is because, when the RSSI of the response signal for vehicle exterior verification is RFmx1 or more, it may be possible that the response signal transmitted from the portable device 200 has been relayed by a relay. For the same reason, when the RSSI of the response signal for vehicle interior verification is RFmx2 or more in the first modification, the verification processing unit F3 may also determine that the verification is unsuccessful.

The invention claimed is:

1. An electronic key system for a vehicle, comprising:
an in-vehicle device that is to be mounted in a vehicle; and
a portable device that is associated with the in-vehicle device, and is to be carried by a user of the vehicle, the in-vehicle device being configured to perform a predetermined control process on the vehicle on the basis of verification successfully made between the in-vehicle device and the portable device using wireless communication, wherein
the in-vehicle device includes:
a transmitter configured to transmit a verification signal for authenticating the portable device from a vehicle transmission antenna provided in the vehicle, and wherein
the portable device includes:
one or more push button switches configured to detect a user operation performed to control a locking state of the vehicle;
a receiver configured to receive the verification signal via a portable-device reception antenna;
a transmitter configured to transmit a signal in a predetermined frequency band from a portable-device transmission antenna; and
an amplifier attenuator circuit configured to adjust an output level of the signal to be transmitted from the portable-device transmission antenna,
wherein transmitter of the portable device is further configured to transmit a response signal in accordance with the verification signal in response to the receiver of the portable device receiving the verification signal, and to transmit an instruction signal for controlling a locking state of a door of the vehicle in response to the one or more push button switches detecting the user operation, and wherein
the amplifier attenuator circuit is further configured to set an output level of the response signal to a predetermined level lower than an output level of the instruction signal, and wherein
the verification signal includes verification situation information indicating that the verification signal corresponds to at least one of a vehicle interior verification signal and a vehicle exterior verification signal, and wherein
the transmitter of the in-vehicle device is further configured to transmit the vehicle interior verification signal to authenticate the portable device inside the vehicle and to transmit the vehicle exterior verification signal to authenticate the portable device outside the vehicle, and wherein
the portable device further includes a microcomputer having a processor, the microcomputer of the portable device configured to determine, on the basis of the verification situation information in the verification signal, to which of the vehicle interior verification signal and the vehicle exterior verification signal the response signal transmitted from the transmitter of the portable device is responding, and wherein
the amplifier attenuator circuit is further configured to set an output level of the response signal responding to the vehicle interior verification signal lower than an output level of the response signal responding to the vehicle exterior verification signal.

2. An electronic key system for a vehicle, comprising:
an in-vehicle device that is to be mounted in a vehicle; and
a portable device that is associated with the in-vehicle device and is to be carried by a user of the vehicle, the in-vehicle device being configured to perform a predetermined control process on the vehicle on the basis of verification successfully made between the in-vehicle device and the portable device using wireless communication, wherein
the in-vehicle device includes:
a transmitter configured to transmit a verification signal for authenticating the portable device from a vehicle transmission antenna provided in the vehicle, the verification signal including verification situation information indicating that the verification signal corresponds to at least one of a vehicle interior verification signal and a vehicle exterior verification signal, and wherein the portable device includes:
a receiver configured to receive the verification signal via a portable-device reception antenna;

a transmitter configured to transmit, from a portable-device transmission antenna, a response signal in accordance with the verification signal received by the receiver of the portable device;

an amplifier attenuator circuit configured to adjust an output level of the signal to be transmitted from the portable-device transmission antenna; and a microcomputer having a processor, the microcomputer of the portable device configured to determine, on the basis of the verification situation information included in the verification signal, to which of the vehicle interior verification signal and the vehicle exterior verification signal the response signal transmitted from the transmitter of the portable device is responding, and wherein the transmitter of the in-vehicle device is further configured to transmit the vehicle interior verification signal to authenticate the portable device inside the vehicle and to transmit the vehicle exterior verification signal to authenticate the portable device outside the vehicle, and wherein the amplifier attenuator circuit is further configured to set an output level of the response signal responding to the vehicle interior verification signal to a predetermined level that is lower than an output level of the response signal responding to the vehicle exterior verification signal.

3. The electronic key system for a vehicle according to claim 2, wherein the microcomputer of the portable device is further configured to acquire a received signal strength of the verification signal received by the receiver of the portable device, and wherein the transmitter of the portable device is further configured to transmit the response signal including distance-related information, the distance-related information being information determined by the received signal strength acquired by the microcomputer of the portable device and used by the in-vehicle device to estimate a distance between the portable device and the vehicle, and wherein the in-vehicle device further includes:
  a receiver configured to receive a signal from the portable device via a vehicle reception antenna provided in the vehicle; and
  a computer including a processor, the computer of the in-vehicle device configured to
    acquire a received signal strength of the response signal received by the receiver of the in-vehicle device; and
    in response to the receiver of the in-vehicle device receiving the response signal responding to the vehicle exterior verification signal, determine whether a return route distance as a distance to the portable device estimated from the received signal strength of the response signal acquired by the computer of the in-vehicle device matches an outward route distance as a distance to the portable device estimated from the distance-related information included in the response signal, and wherein in response to the computer of the in-vehicle device determining that the outward route distance does not match the return route distance, the computer of the in-vehicle device is further configured to determine that the vehicle exterior verification is unsuccessful.

4. The electronic key system for a vehicle according to claim 3, wherein the microcomputer of the portable device and the amplifier attenuator circuit are further configured to set a vehicle exterior response level as the output level of the response signal responding to the vehicle exterior verification signal in advance, and wherein the computer of the in-vehicle device further includes memory configured to store a vehicle exterior reception strength map showing a correspondence relationship between the received signal strength of the response signal responding to the vehicle exterior verification signal and a distance from the in-vehicle device to the portable device, and wherein in response to the response signal responding to the vehicle exterior verification signal, the computer of the in-vehicle device is further configured to estimate the return route distance from the received signal strength of the response signal acquired by the computer of the in-vehicle device and the vehicle exterior reception strength map.

5. The electronic key system for a vehicle according to claim 4, wherein the distance-related information is the received signal strength acquired by the microcomputer of the portable device, and wherein the memory is further configured to store a portable-device reception strength map showing a correspondence relationship between the received signal strength acquired by the microcomputer of the portable device and the distance from the in-vehicle device to the portable device, and wherein the computer of the in-vehicle device is further configured to estimate the return route distance from the received signal strength as the distance-related information and the portable-device reception strength map.

6. The electronic key system for a vehicle according to claim 4, wherein the microcomputer of the portable device and the amplifier attenuator circuit are further configured to set a vehicle interior response level as the output level of the response signal responding to the vehicle interior verification signal in advance, and wherein the memory is further configured to store a vehicle interior reception strength map showing a correspondence relationship between the received signal strength of the response signal responding to the vehicle interior verification signal and the distance from the in-vehicle device to the portable device, and wherein in response to receiver of the in-vehicle device receiving the response signal responding to the vehicle interior verification signal, the computer of the in-vehicle device is further configured to estimate the return route distance from the received signal strength of the response signal acquired by the computer of the in-vehicle device and the vehicle interior reception strength map, and to determine whether the outward route distance estimated from the distance-related information included in the response signal matches the return route distance, and wherein in response to the computer of the in-vehicle device determining that the outward route distance does not match the return route distance, the computer of the in-vehicle device is further configured to determine that the vehicle interior verification is unsuccessful.

7. The electronic key system for a vehicle according to claim 3, wherein the microcomputer of the portable device and the amplifier attenuator circuit are further configured to set a vehicle interior response level as the output level of the response signal responding to the vehicle interior verification signal in advance, and wherein when the received signal strength of the response signal returned from the portable device in response to the vehicle interior verification signal is larger than a vehicle interior reception strength maximum value, the computer of the in-vehicle device is further configured to determine that the vehicle interior verification is unsuccessful.

8. A portable device for use in an electronic key system for a vehicle in which an in-vehicle device mounted in a vehicle and the portable device associated with the in-vehicle device perform verification between each other using wireless communication and perform a predetermined control process on the vehicle on the basis of the verification made successfully, the portable device comprising:

one or more push button switches configured to detect a user operation performed to control a locking state of the vehicle;

a receiver configured to receive a verification signal transmitted from the in-vehicle device to authenticate the portable device;

a transmitter configured to transmit a signal in a predetermined frequency band from a portable-device transmission antenna; and an amplifier attenuator circuit configured to adjust an output level of the signal to be transmitted from the portable-device transmission antenna, wherein, the transmitter of the portable device is further configured to transmit a response signal in accordance with the verification signal in response to the receiver of the portable device receiving the verification signal, and to transmit an instruction signal for controlling a locking state of a door of the vehicle in response to the one or more push button switches detecting the user operation, and wherein the verification signal includes verification situation information indicating that the verification signal corresponds to at least one of a vehicle interior verification signal and a vehicle exterior verification signal, the vehicle interior verification signal for authenticating the portable device inside the vehicle and the vehicle exterior verification signal for authenticating the portable device outside the vehicle, and wherein the portable device further includes a microcomputer having a processor, the microcomputer of the portable device configured to determine, on the basis of the verification situation information in the verification signal, to which of the vehicle interior verification signal and the vehicle exterior verification signal the response signal transmitted from the transmitter of the portable device is responding, and wherein the amplifier attenuator circuit is further configured to set an output level of the response signal to a predetermined level lower than an output level of the instruction signal.

* * * * *